United States Patent [19]

Fukui et al.

[11] Patent Number: 4,563,493

[45] Date of Patent: Jan. 7, 1986

[54] OMEGA-PERFLUOROALKYL-1,2-EPOXY-ALKANE COPOLYMER AND USE THEREOF

[75] Inventors: Shosin Fukui, Toyonaka; Masayoshi Shinjo, Settsu; Yasuko Okazaki, Yamatokohriyama; Hirokazu Aoyama, Takatsuki, all of Japan

[73] Assignee: Daikin Industries, Ltd., Osaka-fu, Japan

[21] Appl. No.: 697,865

[22] Filed: Feb. 4, 1985

[30] Foreign Application Priority Data

Feb. 8, 1984 [JP] Japan .................................. 59-22361
Mar. 7, 1984 [JP] Japan .................................. 59-44390

[51] Int. Cl.$^4$ ........................ C08G 65/22; C08G 65/26
[52] U.S. Cl. .................................... 524/233; 524/315; 524/361; 524/462; 524/612; 528/103; 528/354; 528/359; 528/402; 568/677; 525/410; 525/415
[58] Field of Search .............. 524/233, 315, 361, 462, 524/612; 528/354, 359, 103, 402; 568/677

[56] References Cited

U.S. PATENT DOCUMENTS 3,417,035 12/1968 Elmer et al. ..................... 528/402 X
4,094,911 6/1978 Mitsch et al. ..................... 528/402 X
4,356,291 10/1982 Darling ............................ 528/402 X
4,363,898 12/1982 Krespan et al. ................. 528/402 X

*Primary Examiner*—Earl Nielsen
*Attorney, Agent, or Firm*—Birch, Stewart, Kolasch & Birch

[57] ABSTRACT

A novel copolymer comprising
(a) repeating units of the formula:

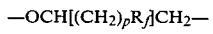

(Ia)

or

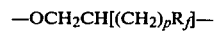 (Ib)

wherein $R_f$ is $C_3$-$C_{21}$ perfluoroalkyl and p is an integer of 1 to 10 and (b) repeating units of the formula:

$$-(OCH_2)_m(CH_2)_n-$$   (II)

wherein m is an integer of 1 to 4 and n is an integer of 2 to 10 when m is 1, an integer of 1 to 8 when m is 2 or an integer of 0 to (12−2m) when m is 3 or 4,

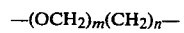 (III)

wherein $R^1$ and $R^2$ are each hydrogen, $CH_3$, $CH_2Cl$, $CH_2F$, $CH_2OCH_3$, $CH_2OC_2H_5$, $CH_2OCOCH_3$, $CH_2OC_6H_5$, $CH_2OH$ or $CH_2CN$ provided that at least one of them is not hydrogen,

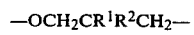 (IV)

wherein q is 2 or 3, and/or

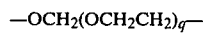 (V)

wherein $R^3$ is $CH_2$ or $CF_2$ and r is an integer of 2 to 5, which is particularly useful as a water- and oil-repellent and a non-tackifier.

10 Claims, No Drawings

OMEGA-PERFLUOROALKYL-1,2-EPOXYALKANE COPOLYMER AND USE THEREOF

FIELD OF THE INVENTION

The present invention relates to an ω-perfluoroalkyl-1,2-epoxyalkane copolymer and use thereof. More particularly, it relates to an ω-perfluoroalkyl-1,2-epoxyalkane copolymer and a water- and oil-repellent and a non-tackifier comprising the same.

BACKGROUND OF THE INVENTION

Known copolymers of ω-perfluoroalkyl-1,2-epoxyalkane include a polyether type copolymer of an epoxide of the formula:

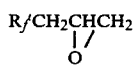

wherein $R_f'$ is $C_5$–$C_{13}$ perfluoroalkyl with ethylene oxide, propylene oxide, epichlorohydrin, perfluoropropylene oxide, isobutylene oxide, butadiene oxide, styrene oxide, methyl glycidyl ether or allyl glycidyl ether (cf. Japanese Patent Publication No. 25361/1971), and a polyester type copolymer of an epoxide of the formula:

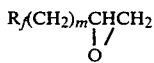

wherein $R_f$ is $C_3$–$C_{21}$ perfluoroalkyl with a cyclic acid anhydride such as succinic anhydride, maleic anhydride, phthalic anhydride, etc. (cf. Japanese Patent Publication Nos. 11324/1982 and 1325/1982). These copolymers find application as a water- and oil-repellent and a non-tackifier as well as do a homopolymer of an ω-perfluoroalkyl-1,2-epoxyalkane and a copolymer of two or more ω-perfluoroalkyl-1,2-eopxyalkanes. The latter homo- or copolymer is hardly or not soluble in various organic solvents and their application is restricted, while the former copolymers does not have such drawbacks.

Productivity of the copolymer of the ω-perfluoroalkyl-1,2-epoxyalkane with ethylene oxide, etc. is not good since the reactivity of the ω-perfluoroalkyl-1,2-epoxyalkane is much lower than that of the comonomer so that the homopolymers of the former and of the latter are formed together with the copolymer and, in order to get the desired pure copolymer, it is necessary to separate it from the homopolymer mixture. Productivity of the copolymer with the cyclic acid anhydride is better than the copolymer with ethylene oxide, etc. but poor in water- and oil-repellency or non-tackifying property.

SUMMARY OF THE INVENTION

One object of the invention is to provide a novel copolymer of ω-perfluoroalkyl-1,2-epoxyalkane.

Another object of the invention is to provide a copolymer of ω-perfluoroalkyl-1,2-epoxyalkane having good solubility in various organic solvent, improved productivity, and excellent oil-repellency and non-tackifying property.

Further object of the invention is to provide a water- and oil-repellent comprising the novel copolymer of ω-perfluoroalkyl-1,2-epoxyalkane.

Still further object of the invention is to provide a non-tackifier comprising the novel copolymer of ω-perfluoroalkyl-1,2-epoxyalkane.

DETAILED DESCRIPTION OF THE INVENTION

The above objects is achieved by a novel copolymer of the invention comprising
(a) repeating units of the formula:

or

wherein $R_f$ is $C_{13}$–$C_{21}$ perfluoroalkyl and p is an integer of 1 to 10 and
(b) repeating units of the formula:

wherein m is an integer of 1 to 4 and n is an integer of 2 to 10 when m is 1, an integer of 1 to 8 when m is 2 or an integer of 0 to (12−2m) when m is 3 or 4,

wherein $R^1$ and $R^2$ are each hydrogen, $CH_3$, $CH_2Cl$, $CH_2F$, $CH_2OCH_3$, $CH_2OC_2H_5$, $CH_2OCOCH_3$, $CH_2OC_6H_5$, $CH_2OH$ or $CH_2CN$ provided that at least one of them is not hydrogen,

wherein q is 2 or 3, and/or

wherein $R^3$ is $CH_2$ or $CF_2$ and r is an integer of 2 to 5.

In the copolymer of the invention, the molar ratio of the repeating units (a) and (b) is preferably from 3:97 to 99:1, more preferably from 30:70 to 90:10. The average molecular weight of the copolymer is usually from 2,000 to 50,000, preferably from 5,000 to 20,000. When the average molecular weight is lower than 2,000, the water- and oil-repellency is not satisfactorily improved, and when it is higher than 50,000, its solubility in an organic solvent is decreased.

A part of the repeating units (b) may be replaced by other oxyethylene unit (c) of the formula:

wherein $R^4$, $R^5$, $R^6$ and $R^7$ are each hydrogen, $C_1$–$C_5$ alkyl, aryl (eg., phenyl, etc), substituted alkyl or substituted aryl. The substituent may be halogen. The ratio of the repeating unit (c) may be 0 to 80% by mole of the whole copolymer.

The copolymer of the invention is a polyester or polyether having a perfluoroalkyl group as a side chain, and useful as a coating material on various solid substrates. The coating film of the copolymer of the invention exhibits a low surface activity due to the perfluoroalkyl side chain and has good adhesivity with surfaces of various substrates due to polyester or polyether linkages in the backbone chain. Therefore, the copolymer of the invention is useful as a water- and oil-repellent or a non-tackifier for various solid substrates, for example, fabrics, metals, glass, ceramics, natural and synthetic polymers, etc.

The copolymer of the invention may be prepared by reacting an epoxide of the formula:

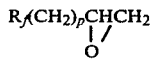  (I′)

wherein $R_f$ and p are the same as defined above with a cyclic ether, formal and/or ester of the formula:

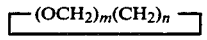  (II′)

wherein m and n are the same as defined above,

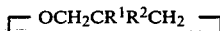  (III′)

wherein $R^1$ and $R^2$ are the same as defined above,

  (III′)

wherein q is the same as defined above, or

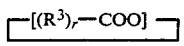  (V′)

wherein $R^3$ and r are the same as defined above under a suitable polymerization condition.

To incorporate the repeating unit (c) in place of a part of the repeating units (b) in the copolymer, a part of the compound (II′), (III′), (IV′) or (V′) is replaced by a substituted epoxide of the formula:

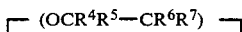  (VI′)

wherein $R^4$, $R^5$, $R^6$ and $R^7$ are the same as defined above.

The above reaction is a ring opening copolymerization of the epoxide (I′) and the compound (II′), (III′), (IV′) or (V′) and optionally the substituted epoxide (VI′), and the backbone chain of the copolymer is linked by ester and/or ether linkages.

One of the starting material, namely the epoxide (I′) is as known compound. For example, 2-perfluoroalkyl-1,2-epoxyethene (the epoxide (I′) wherein p is 0) and its preparation is disclosed in DE-OS 2 160 783. 3-Perfluoroalkyl-1,2-epoxypropane (the epoxide (I′) wherein p is 1) is disclosed in Japanese Patent Publication No. 26286/1969 and prepared by reacting 3-perfluoroalkyl-2-iodopropanol-1 and alkali metal hydroxide.

$R_f$ is $C_3$–$C_{21}$ perfluoroalkyl, preferably $C_5$–$C_{16}$ perfluoroalkyl. In the present invention, the starting material may be a mixture of two or more epoxides (I′) bearing different $R_f$s having different numbers of carbon atoms.

The cyclic compound (II′) wherein m is 1 and the cyclic compound (III′) are cyclic ethers and their specific examples are oxetane, tetrahydrofuran, teterahydropyrane, 3,3-bis(chloromethyl)oxetane, etc.

The cyclic compound (II′) wherein m is an integer of 2 to 4 and the cyclic compound (IV′) are cyclic formals and their specific examples are 1,3-dioxolan (the compound (II′) wherein m is 2 and n is 1), trioxan (the compound (II′) wherein m is 3 and n is 0), tetraoxan (the compound (II′) wherein m is 4 and n is 0), 1,3,6-trioxokan (the compound (IV′) wherein q is 2), 1,3,5-trioxokan (the compound (II′) wherein m is 3 and n is 2), etc.

Specific examples of the cyclic ester V′) are β-propiolactone, γ-butyllactone, δ-valerolactone, ε-caprolactone and perfluoro-γ-butyllactones disclosed in Japanese Patent Kokai Publication (unexamined) Nos. 23020/1977 and 83417/1977.

Specific examples of the optionally used epoxide (VI′) are ethylene oxide, propylene oxide, isobutylene oxide, butadiene oxide, styrene oxide, epihalohydrin (eg., epichlorohydrin), alkyl glycidyl ether (eg., methyl glycidyl ether), aryl glycidyl ether (eg., phenyl glycidyl ether), etc.

Copolymerization of the epoxide (I′) which optionally contains the epoxide (VI′) and the cyclic ether, formal or ester is carried out in the presence of a polymerization initiator. The initiator is selected from compounds which is known to be active to initiate ring opening polymerization of the epoxide, for example, cationic polymerization initiators, for example, boron trifluoride, boron trifluoride complexes (eg., $BF_3O(C_2H_5)_2$), metal halides (eg., tin tetrachloride, $AlCl_3$, etc.), amines (eg., triethylamine, etc.), and coordinated anionic polymerization initiators, for example, trialkyl aluminum, dialkyl zinc, phosphoric acid, etc. Reaction temperatures are not critical in the copolymerization and depend on reactivities of the monomers. Preferably, the range of the reaction temperatures is from 0° to 50° C. The copolymerization does not necessarily require a solvent, but may be carried out in a suitable solvent, for example, to control the reaction temperature. The solvent is selected from those inactive against the monomers to be copolymerized, for example, trichlorotrifluoroethane, dimethylformamide, dimethoxyethane, n-hexane and ethers.

The copolymer of the invention comprises the repeating units (a) and (b) and optionally the repeating units (c), and it is a thermoplastic copolymer with transparent appearance. A glass transition temperature of the copolymer of the invention varies with the kinds and molar ratio of the monomers. Generally, it is in a range from 0° to 150° C., particularly from 20° to 100° C. The copolymer of the invention is soluble in many organic solvents such as acetone, ethyl acetate, chloroform, trichlorotrifluoroethane, hexane, toluene, etc. While the copolymer containing the repeating units (a) in a higher ratio is insoluble in water, ethanol or methanol, that containing them in a lower ratio, particularly 20% by mole or less is soluble in these solvents. The solubility of the copolymer of the invention in the solvent depends on the kinds and ratio of the monomers to be polymerized.

One of the characteristics of the copolymer of the invention is that the copolymer can impart water- and oil-repellency to a solid substrate by applying a solution or an aqueous emulsion of the copolymer on it. The solution or the aqueous emulsion of the copolymer may be casted to form a self-supporting film, which has water- and oil-repellency. Further, the copolymer may be used as a leveling agent of a coating when it is added to various solvents and liquid resins such as epoxy resin and polyester resin, their surface tension can be reduced.

As described above, the copolymer of the invention as such or in the form of the solution in the organic solvent or an aqueous emulsion finds various applications. Particularly, it is useful as a water- and oil-repellent or a non-tackifier since the perfluoroalkyl side chain has low surface energy.

The water- and oil-repellent is an agent which reduces a critical surface tension of a solid substrate and imparts to the substrate a property to repel an aqueous material and/or an oily material. The aqueous material includes water, water soluble materials (eg. alcohols, etc) and their aqueous solution, and the oily material includes mineral oils (eg., kerosene, fuel oil, gasoline, liquid paraffin, pitch, asphalt, etc.), vegetable oils (eg., cotton seed oil, rape seed oil, etc.), and animal oils (eg., whale oil, etc.). When the substrate is fiber or fabrics, the water- and oil-repellent prevent them from being stained with aqueous stain such as ink and sauce or oily stain such as frying oil and the mineral oil by repelling these. When paper or a sheet material is treated with the water- and oil-repellent, it is used as a wrapping material which can prevent penetration of asphalt or oils.

The non-tackifier is an agent which reduces the critical surface tension of a solid substrate and prevent it from being sticked with a tacky material and includes a mold release agent, a backing agent, an agent for manufacturing a releasable paper, an anti-blocking agent, etc. The mold release agent is applied on a metal or wood mold, which is used for molding a rubber or a resin by spraying or coating to improve releasability of the molded article from the mold. The mold release agent includes a so-called internal mold release agent which is compounded in the rubber or resin to be molded. The backing agent and the agent for manufacturing the releasable paper includes one which is applied on a backing of a mending tape or adhesive tape to prevent permanent bonding of the wound tape and to make it easy to unwind the tape, and one which is used in manufacturing the releasable paper which is applied on the backing of a label or a plate or used in the production of a film and plywood. The anti-blocking agent is an agent which is used to prevent blocking of the sheets or films which are put in contact for a long time.

The water- or oil-repellent or the non-tackifier formulation comprising the copolymer of the invention may be prepared by dissolving it in the organic solvent or diluting the reaction mixture containing it with the organic solvent. Specific examples of the organic solvent are acetone, methyl ethyl ketone, ethyl acetate, dimethylformamide, methylchloroform, trichloroethylene, trichlorotrifluoroethane, tetrachlorodifluoroethane, hexane, toluene, and mixtures thereof. An aerosol formulation may be prepared by adding an aerosol propellant (eg., dichlorodifluoromethane, monofluorotrichloromethane, dimethyl ether, etc.) to the solution of the copolymer and filling it in a suitable vessel. The copolymer of the invention may be used in the form of an aqueous emulsion thereof, which may be prepared by emulsifying it in an aqueous medium in the presence of a surfactant and optionally in the presence of various additives. The surfactant may be an anionic, nonionic or cationic one. The copolymer as such may be applied to the substrate.

Any composition of the copolymer of the invention may be used as the water- and oil-repellent and the non-tackifier. Preferably, the repeating unit (a) is contained in an amount not smaller than 3% by mole.

The substrate to be treated by the water- and oil-repellent of the invention includes various materials such as fiber, fabrics, paper, wood, leather, felt, asbestos and bricks, and further metals, tiles, plastics and their coated surfaces. Examples of the fiber and fabrics are natural fiber (eg., cotton, jute, wool, silk, etc.), synthetic fiber (eg., polyamide, polyester, polyvinyl acetal, polyacrylonitrile, polyvinyl chloride, polypropylene, etc.), semi-synthetic fiber (eg., rayon, acetate, etc.) and inorganic fiber (eg., glass fiber, asbestos fiber, etc.), blended fiber thereof and fabrics thereof.

The substrate to which the non-tackiness is imparted by the copolymer of the invention includes the same material as is treated by the water- and oil-repellent of the invention. Particularly, the natural and synthetic resins (eg., polyurethane resin, epoxy resin, phenol resin, polyvinyl chloride resin, acrylic resin, etc.), natural and synthetic elastomers (eg., natural rubber, chloroprene rubber, fluorine-containing rubber, etc.). The mold release agent of the invention is applied to any mold including a metal, wooden plastic or paper mold and used in the treatment of the backing of the adhesive tape made of paper, cellophane, cloth or plastics and the production of the released paper for the label or wappen.

The concentration of the copolymer in the water- and oil-repellent is not critical and usually from 0.01 to 30% by weight, preferably from 0.1 to 2.0% by weight. When the concentration is too low, the water- and oil-repellecy is not sufficiently imparted, and when it is too high, it is economically unfavorable. If desired, the water- and oil-repellent of the invention may contain an antistatic additive, a flame retardant, a crease resisting agent, a film-forming resin (eg., acrylic resin, vinyl acetate resin, etc.) and/or fine powder of silicon oxide, polytetrafluoroethylene, etc.

When the non-tackifier is used as the mold release agent for a mold used only one time, the concentration of the copolymer may be 0.01% or less. However, when the mold release effect is expected several times, the concentration is preferably from 0.05 to 30% by weight, more preferably from 0.1 to 10% by weight. The concentration of the copolymer in the backing treating agent or the anti-blocking agent is the same as in the mold release agent. When the copolymer is used as the internal mold release agent, it is added to the material to be molded in an amount of 0.05 to 10% by weight, preferably form 0.1 to 3% by weight of the weight of the resin. If desired, the water- and oil-repellent of the invention may contain an antistatic additive, a flame retardant, a crease resisting agent, a film-forming resin (eg., acrylic resin, vinyl acetate resin, etc.) and/or fine powder of silicon oxide, polytetrafluoroethylene, etc. The non-tackifier of the invention may contain the above film-forming resin, a coating (eg., lacquer, a polyvinyl chloride coating, etc.), the fine powder and/or an oil (eg., silicon oil, fluorine-containing oil, etc.).

The water- and oil-repellent and the non-tackifier of the invention is applied to the substrate in a suitable manner depending on a kind and field of use of the substrate, end use and the form of the agent. When it is in the form of a solution or an emulsion, it is applied on the surface of the substrate by spraying, dipping or coating, dried and optionally cured. When it is in the form of an aerosol, it is sprayed on the surface of the substrate and dried and optionally cured.

The present invention will be hereinafter explained further in detail by Examples, in which % and parts are by weight unless otherwise indicated.

In Examples, water-repellency is expressed by "Water-repellency Number" of Table 1 determined according to the spray method of JIS (Japanese Industrial Standards) L-1005, and the oil-repellency is expressed by "Oil-repellency Number" of Table 2 determined by dropping a mixture of n-heptane and Nujol having a composition shown in Table 2 on the surface of a sample cloth previously treated with the test material and observing the retention of the drop over a period of 3 minutes.

TABLE 1

| Water-repellency No. | State |
| --- | --- |
| 100 | No wet on the surface |
| 90 | Slight wet on the surface |
| 80 | Partial wet on the surface |
| 70 | Wet on the surface |
| 50 | Wet over the whole surface |
| 0 | Complete wet through the surface to the reverse |

TABLE 2

| Oil-repellency Number | Mixture composition (% by volume) | |
| --- | --- | --- |
| | n-Heptane | Nujol |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | (100% Nujol not retained) | |

EXAMPLE 1

To a 50 ml flask equipped with a reflux condenser and a stirrer, a compound of the formula:

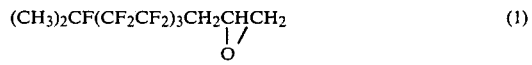

(9.67 g), tetrahydrofuran (0.33 g) and trichlorotrifluoroethane (30 g) were charged in a nitrogen atmosphere and stirred. After adjusting the temperature of the flask interior at 30° C., a 47% solution of boron trifluoride etherate in ethyl ether (0.1 ml) was added and reacted at 30° C. for 24 hours. Gas chromatographic analysis revealed that the conversions of Compound (1) and tetrahydrofuran were 95.5% and 100%, respectively.

The reaction mixture was poured in methanol to obtain a transparent precipitate, which was purified by dissolving it in triclorotrifluoroethane and pouring the thus obtained solution in methanol to obtain the greasy transparent product (8.32 g). Yield 83.2%. The product had a glass transition temperature (Tg) of 30.3° C., and the structure of the copolymer was determined by analyzing $^1$H-NMR spectrum of the product as follows:

| | Chemical Shift δ (ppm) | Signal strength |
| --- | --- | --- |
| A | 2.37 | 4.6 H |
| B | 1.70 | 2.4 H |
| C | 3.3–4.3 | 9.7 H |

-continued

| Chemical Shift δ (ppm) | Signal strength |
| --- | --- |

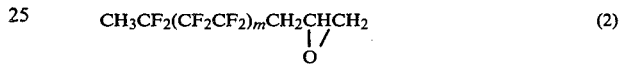

From the ratio of the signal strength per proton *A (2.37 ppm) to that per proton *B (1.70 ppm), x and y in the formula (1a) were calculated to be 3.84 and 1, respectively. The average molecular weight of the copolymer was determined to be 12,500 from gel permeation chromatography, and z was calculated to be about 6.0.

Elemental analysis: Calc'd: C, 28.87, H, 1.28, F, 65.13 Found: C, 28.73, H, 1.30, F, 66.26

EXAMPLE 2

To a 4 liter flask equipped with a flux condenser and a stirrer, a mixture of compounds of the formula:

$$CH_3CF_2(CF_2CF_2)_mCH_2\underset{O}{\underset{\diagdown\diagup}{CHCH_2}} \quad (2)$$

(m=3, 61% by mole, m=4, 26% by mole, m=5, 9% by mole, m=6, 3% by mole and m=7, 1% by mole) (937 g), tetrahydrofuran (63 g) and trichlorotrifluoroethane (3 Kg) were charged in a nitrogen atmosphere and stirred. After adjusting the temperature of the flask interior at 30° C., a 47% solution of boron trifluoride etherate in ethyl ether (10 ml) was added and reacted at 30° C. for 5 hours. Gas chromatographic analysis revealed that the conversions of Compounds (2) and tetrahydrofuran were 97.6% and 100%, respectively. Thereafter, the reaction mixture was heated to 70° C. and the solvent was evaporated off. The viscous liquid residue was cooled to a room temperature to obtain the brown solid product (975 g). M.P., 36° C.

The structure of the copolymer was determined by analyzing $^1$H-NMR spectrum of the product as follows:

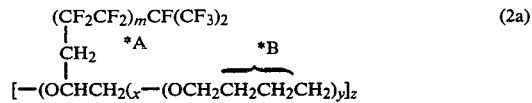

From the ratio of the signal strength per proton *A (2.4 ppm) to that per proton *B (1.7 ppm), x and y in the formula (2a) were calculated to be 1.94 and 1, respectively.

EXAMPLE 3

To a 50 ml flask equipped with a flux condenser and a stirrer, a compound of the formula:

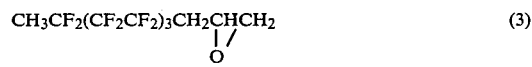

(9.28 g), 1,3-dioxolan (0.72 g) and trichlorotrifluoroethane (30 g) were charged in a nitrogen atmosphere and stirred. After adjusting the temperature of the flask interior at 30° C., a 47% solution of boron trifluoride etherate in ethyl ether (0.1 ml) was added and reacted at 30° C. for 5 hours. Gas chromatographic analysis revealed that the conversions of Compounds (3) and 1,3-dioxolan were 100% and 57%, respectively. The reaction mixture was poured in methanol, and the precipitate was purified by dissolving it in trichlorotrifluoroethane and pouring the solution in methanol to obtain the white brittle solid product (72.3 g). Yield, 72.3%. Tg, 66.5° C.

The structure of the copolymer was determined by analyzing $^1$H-NMR spectrum of the product as follows:

also shown in Table 3. The thus obtained copolymers were white or yellow powders.

TABLE 3

| Example No. | Monomer Compound | Amount (g) | Molar ratio | Solvent (g) | Catalyst*[3] (ml) | Temp. (°C.) | Time (hr.) | Conversion (%) | Yield (g) | Softening point (°C.) |
|---|---|---|---|---|---|---|---|---|---|---|
| 4 | (2) | 2.72 | 1 | S-3*[2] | 0.1 | 25 | 24 | 100 | 3.2 | 23 |
|   | THF*[1] | 7.28 | 20 | 20 |  |  |  | 20.3 |  |  |
| 5 | (2) | 8.82 | 1 | S-3 | 0.1 | 25 | 4 | 100 | 9.1 | 34 |
|   | THF | 1.18 | 1 | 20 |  |  |  | 100 |  |  |
| 6 | (2) | 9.68 | 4 | S-3 | 0.1 | 25 | 2 | 100 | 9.0 | 41 |
|   | THF | 0.32 | 1 | 20 |  |  |  | 100 |  |  |
| 7 | (2) | 9.83 | 8 | S-3 | 0.1 | 25 | 3 | 100 | 96 | 51 |
|   | THF | 0.17 | 1 | 20 |  |  |  | 100 |  |  |
| 8 | (2) | 87.9 | 1 | S-3 | 1 | 25 | 2 | 100 | 88.5 | 57 |
|   | 1,3-dioxolan | 12.1 | 1 | 200 |  |  |  | 75.9 |  |  |
| 9 | (2) | 8.56 | 1 | S-3 | 0.1 | 30 | 2 | 98.1 | 8.3 | 66 |
|   | trioxan | 1.44 | 1 | 20 |  |  |  | 43.8 |  |  |
| 10 | (2) | 9.04 | 4 | S-3 | 0.1 | 25 | 2 | 100 | 9.6 | 46 |
|   | THF | 0.30 | 1 | 20 |  |  |  | 100 |  |  |
|   | phenyl-glycidylether | 0.66 | 1 |  |  |  |  | 100 |  |  |
| 11 | (2) | 9.46 | 4 | S-3 | 0.1 | 25 | 2 | 100 | 9.4 | 45 |
|   | THF | 0.31 | 1 | 20 |  |  |  | 100 |  |  |
|   | epichlorohydrin | 0.23 | 1 |  |  |  |  | 100 |  |  |

Note:
*[1]Tetrahydrofuran
*[2]1,1,2-trifluoro-1,2,2-trichloroethane
*[3]Boron trifluoride etherate

| | Chemical Shift δ (ppm) | Signal strength |
|---|---|---|
| A | 2.36 | 5.2 H |
| B | 4.76 | 1.5 H |
| C | 3.3–4.3 | 10.7 H |

$$\begin{array}{c} (CF_2CF_2)_3CF(CF_3)_3 \\ | \\ CH_2 \quad *A \quad *B \\ | \\ [-(OCHCH_2)_x-(OCH_2OCH_2CH_2)_y]_2 \\ \underbrace{\qquad}_{*C} \quad \underbrace{\qquad}_{*C} \end{array} \quad (3a)$$

From the ratio of the signal strength per proton *A (2.36 ppm) to that per proton *B (4,76 ppm), x and y in the formula (3a) were calculated to be 3.5 and 1, respectively. These values indicate that the copolymerization did not proceed beyond the molar ratio of Compound (3) to 1,3-dioxolan of 3.5:1 although they were charged in the molar ratio of 2:1, and the result corresponds the fact that the conversion of 1,3-dioxolan was 57%. The average molecular weight of the copolymer was determined to be 7,050 from gel permeation chromatography, and z was calculated to be about 3.9.

Elemental analysis: Calc'd: C, 29.24, H, 1.37, F, 62.66 Found: C, 30.37, H, 1.43, F, 62.87

EXAMPLES 4–11

In the same manner as in Examples 1 to 3 but using the monomers in the ratio as shown in Table 3 and carrying out the reaction under the conditions shown in Table 3, the copolymer was prepared. The results are

EXAMPLE 12

To a 50 ml flask equipped with a reflux condenser and a stirrer, Compound (1) (9.35 g, 66.7% by mole), β-propiolactone (0.65 g, 33.3% by mole) and trichlorotrifluoroethane (30 g) were charged in a nitrogen atmosphere and stirred. After adjusting the temperature of the flask interior at 30° C., a 47% solution of boron trifluoride etherate in ethyl ether (0.1 ml) was added and reacted at 30° C. for 2 hours. Gas chromatographic analysis revealed that the conversions of Compound (1) and β-propiolactone were both 100%.

The reaction mixture was poured in methanol to precipitate the product, which was purified by dissolving it in trichlorotrifluoroethane and pouring the thus obtained solution in methanol to obtain the slightly opaque greasy product (7.40 g). Yield 74.0%. Tg, 30.3° C. IR spectrum: 1,740 cm$^{-1}$ (C=O in the ester group), and 1,150–1,250 cm$^{-1}$ and 980 cm$^{-1}$ (C-F).

The structure of the copolymer is as follows:

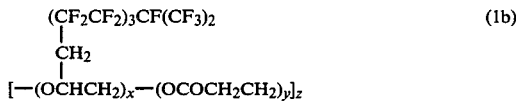

(1b)

Elemental analysis for the copolymer (1b) wherein x=1.7 and y=1:

Calc'd: C, 29.05, H, 1.29, F, 63.52 Found: C, 28.67, H, 1.26, F, 63.22

The average molecular weight of the copolymer was determined to be 13,600 from gel permeation chromatography, and z was calculated to be about 23.

EXAMPLE 13

To the same flask as used in Example 12, Compounds (3) (8.685 g, 50% by mole), β-propiolactone (1.315 g, 50% by mole) and trichlorotrifluoroethane (30 g) were charged and stirred. After adjusting the temperature of the flask interior at 30° C., a 47% solution of boron trifluoride etherate in ethyl ether (0.113 ml) was added and reacted at 30° C. for 4 hours. Gas chromatographic analysis revealed that the conversions of Compounds (3) and β-propiolactone were 80.2% and 100%, respectively.

The reaction mixture was poured in methanol to precipitate the product, which was purified by dissolving it in trichlorotrifluoroethane and pouring the thus obtained solution in methanol to obtain the white brittle solid product (5.02 g). Yield 50.2%. Tg, 67.0° C.

IR spectrum: 1,740 cm$^{-1}$ (C=O in the ester group), and 1,150–1,250 cm$^{-1}$ and 980 cm$^{-1}$ (C-F).

The structure of the copolymer is as follows:

$$\begin{array}{c} (CF_2CF_2)_3CF_2CF_3 \\ | \\ CH_2 \\ | \\ [-(OCHCH_2)_x-(OCOCH_2CH_2)_y]_z \end{array} \quad (3b)$$

Elemental analysis for the copolymer (3b) were found as follows: C, 28.67, H, 1.26, F, 63.22. From the ratio of carbon content and fluorine content, x and y were calculated to be 0.78 and 1, respectively, which correspond to the conversion of Compounds (3) (80.2%). The molecular weight of the copolymer was determined to be 11,600 from gel permeation chromatography.

EXAMPLE 14

To a 1 liter flask equipped with a reflux condenser and a stirrer, the mixture of Compound (2) (236.4 g), β-propiolactone (63.6 g) and trichlorotrifluoroethane (900 g) were charged in a nitrogen atmosphere and stirred. After adjusting the temperature of the flask interior at 30° C., a 47% solution of boron trifluoride etherate in ethyl ether (30 ml) was added and reacted at 30° C. for 8 hours. Gas chromatographic analysis revealed that the conversions of Compounds (2) and β-propiolactone were 98.2% and 100%, respectively. Thereafter, the reaction mixture was heated to 70° C. and the solvent was evaporated off. The viscous liquid residue was cooled to a room temperature to obtain the yellowish brown solid product (294.2 g). M.P., 47° C. IR spectrum: 1,740 cm$^{-1}$ (C=O in the ester group), and 1,150–1,250 cm$^{-1}$ and 980 cm$^{-1}$ (C-F).

EXAMPLES 15–22

In the same manner as in Examples 12 to 14 but using the monomers in the ratio shown in Table 4 and carrying out the reaction under the conditions shown in Table 4, the copolymer was prepared. The results are also shown in Table 4. The thus obtained copolymers were white or light brown solids.

TABLE 4

| Example No. | Monomer Compound | Amount (g) | Molar ratio | Solvent (g) | Catalyst*2 (ml) | Temp. (°C.) | Time (hr.) | Conversion (%) | Yield (g) | Softening point (°C.) |
|---|---|---|---|---|---|---|---|---|---|---|
| 15 | (2) | 8.09 | 1 | S-3*1 | 0.3 | 25 | 24 | 100 | 27.04 | 56 |
|  | β-propiolactone | 21.91 | 20 | 90 |  |  |  | 97.7 |  |  |
| 16 | (2) | 26.46 | 1 | S-3 | 0.3 | 25 | 7 | 97.9 | 29.92 | 52 |
|  | β-propiolactone | 3.59 | 1 | 90 |  |  |  | 100 |  |  |
| 17 | (2) | 29.04 | 4 | S-3 | 0.3 | 30 | 6 | 100 | 29.64 | 50 |
|  | β-propiolactone | 0.96 | 1 | 90 |  |  |  | 98.4 |  |  |
| 18 | (2) | 29.49 | 8 | S-3 | 0.3 | 30 | 8 | 100 | 29.86 | 41 |
|  | β-propiolactone | 0.51 | 1 | 90 |  |  |  | 100 |  |  |
| 19 | (2) | 18.08 | 2 | S-3 | 0.2 | 30 | 6.5 | 82.1 | 19.04 | 49 |
|  | ε-caprolactone | 1.92 | 1 | 60 |  |  |  | 100 |  |  |
| 20 | (2) | 9.69 | 1 | S-3 | 0.2 | 30 | 8 | 100 | 19.12 | 53 |
|  | ε-caprolactone | 10.31 | 5 | 60 |  |  |  | 98.6 |  |  |
| 21 | (2) | 15.76 | 2 | S-3 | 0.25 | 30 | 9 | 100 | 16.98 | 42 |
|  | βpropiolactone | 2.12 | 1 | 60 |  |  |  | 96.2 |  |  |
|  | tetrahydrofuran | 2.12 | 1 |  |  |  |  | 84.0 |  |  |
| 22 | (2) | 15.29 | 1 | S-3 | 0.25 | 30 | 8 | 99.6 | 19.21 | 48 |
|  | β-propiolactone | 2.06 | 1 | 60 |  |  |  | 100 |  |  |
|  | epichlorohydrin | 2.65 | 1 |  |  |  |  | 100 |  |  |

Note:
*1 and *2 See Notes 2 and 3 in Table 3

Applications of the copolymers of the invention will be hereinafter illustrated.

1. Water- and Oil-Repellent for Fabric

Each copolymer prepared in Examples 4–9 and 15–20 was dissolved in a mixed solvent of acetone (20%) and trichlorotrifluoroethane (80%) in a solid content of 1%. Polyester amunzen fabric was dipped in a weight of the resulting solution equal to the fabric weight, squeezed by a mangle and dried at 100° C. for 3 minutes. Water- and oil-repellency of the thus treated fabric was evaluated. The results are shown in Table 5.

TABLE 5

| Copolymer | Water repellency | Oil repellency |
|---|---|---|
| Example 4 | 70 | 70 |
| Example 5 | 90 | 100 |
| Example 6 | 100 | 110 |
| Example 7 | 100 | 110 |
| Example 8 | 90 | 100 |
| Example 9 | 90 | 100 |
| Example 15 | 70 | 70 |
| Example 16 | 100 | 100 |
| Example 17 | 100 | 110 |
| Example 18 | 110 | 110 |
| Example 19 | 100 | 110 |
| Example 20 | 90 | 100 |
| No treatment | 0 | 0 |

2. Contact Angle

On various substrates, a 1% solution of the copolymer of the invention in the same mixed solvent as used in the above was coated and dried, and contact angles of water and n-hexadecane against the coated surface were measured. The results are shown in Table 6.

TABLE 6

| | Water (°) | n-Hexadecane (°) |
|---|---|---|
| Aluminum | | |

TABLE 6-continued

|  | Water (°) | n-Hexadecane (°) |
|---|---|---|
| No treatment | 15 | 10 or smaller |
| Example 6 | 122 | 81 |
| Example 8 | 119 | 77 or smaller |
| Example 17 | 124 | 82 |
| Example 19 | 121 | 79 or smaller |
| Glass plate |  |  |
| No treatment | 10 | 10 or smaller |
| Example 7 | 121 | 82 |
| Example 18 | 125 | 83 |
| Polyester film |  |  |
| No treatment | 38 | 10 or smaller |
| Example 6 | 123 | 82 |
| Example 17 | 125 | 82 |

3. Mold Release Agent

On an inner surface of an aluminum made mold (6 cm in diameter and 3 cm in length), a 2% solution of the copolymer of the invention in a solvent shown in Table 7 or a commercially available mold release agent was coated and dried at a room temperature. In the cavity of the thus coated mold, there was poured a mixture prepared by mixing following Compositions A and B at 5,000 rpm for 10 seconds:

|  | Parts |
|---|---|
| Composition A |  |
| Sumisen 3900*[1] (polyol) | 90 |
| Water (foaming agent) | 1.6 |
| Triethanolamine (catalyst) | 3 |
| Triethylamine (catalyst) | 0.5 |
| Kaolizer No. 1*[2] (foam stabilizer) | 0.5 |
| Composition B |  |
| Sumijuru 44V-20*[3] (isocyanate) | 41.3 |

Note:
*[1] and *[3]Manufactured by Sumitomo Bayer Urethane Co., Ltd.
*[2]Manufactured by Kao Corporation.

The mixture was cured for 10 minutes and mold releasing property was evaluated by measuring peel strength with a tensile tester. The results are shown in Table 7.

TABLE 7

| Copolymer (Amount) | Other ingredient (Amount) | Solvent | Peel strength (g/cm²) |
|---|---|---|---|
| Example 5 (2%) |  | S-3*[1] 48% n-Hexane 50% | 55 |
| Example 2 (2%) |  | S-3 48% n-Hexane 50% | 50 |
| Example 6 (2%) |  | S-3 48% n-Hexane 50% | 91 |
| Example 7 (2%) |  | S-3 80% Acetone 18% | 95 |
| Example 8 (2%) |  | S-3 80% Acetone 18% | 96 |
| Example 9 (2%) |  | S-3 80% Acetone 18% | 102 |
| Example 6 (0.5%) | Dimethylsiloxane oil 1.0% Silicone varnish 0.5% | S-3 90% Acetone 8% | 23 |
| Example 2 (1%) | Carnauba wax 1% | S-3 30% n-Hexadecane 68% | 95 |
| Example 21 (2%) |  | S-3 48% n-Hexane 50% | 86 |
| Example 17 (2%) |  | S-3 98% | 51 |
| Example 18 (2%) |  | S-3 98% | 49 |
| Example 15 (2%) |  | S-3 80% Acetone 18% |  |
| Example 19 (2%) |  | S-3 80% Acetone 18% | 54 |
| Example 22 (2%) |  | S-3 80% Acetone 18% | 95 |
| Example 18 (0.5%) | Dimethylsiloxane oil 1.0% Silicone varnish 0.5% | S-3 90% Acetone 8% | 16 |
| Example 19 (1%) | Carnauba wax 1% | S-3 30% n-Hexadecane 68% | 43 |
| Commercially available wax type mold release agent |  |  | 130 |
| Commercially available silicone type mold release agent |  |  | 70 |

Note:
*[1]See Notes of Table 3.

4. Internal Mold Release Agent 0.02 Part of the copolymer prepared in Example 1, 2, 4, 15, 20 or 22 and 100 parts of Epikote 828 (Epoxy resin manufactured by Shell Chemical) were mixed and, then, 10 parts of triethylenetetramine was mixed. The thus obtained mixture was charged in a mold (4 cm in inner diameter and 2 mm in depth) which had been cleaned but not coated with any mold release agent. Thereafter, the mold containing the mixture was kept standing at a room temperature for 2 hours and then cured at 100° C. for 1 hour. The cured mixture was easily removed from the mold.

The contact angles of water and n-hexadecane against the cured articles were 119° and 67°, respectively.

When any copolymer was not mixed in the epoxy resin, the cured article was firmly bonded to the mold.

5. Release Agent

180° Peel strength was measured with the copolymers prepared in Examples 6, 7, 8, 17, 18 and 19.

The copolymer was dissolved in a solvent shown in Table 8 in a concentration of 2%. The thus prepared solution was coated on a polyester film by means of a bar coater No. 8 and dried. After load was applied at 20° C. for 20 hours, 180° peel strength was measured by using a polyester tape (manufactured by Nitto Electric Industries). The results are shown in Table 8.

TABLE 8

| Copolymer | Solvent | Peel strength (g/cm²) |
|---|---|---|
| Example 6 | Trichlorotrifluoroethane 30% Acetone 70% | 21 |
| Example 7 | Trichlorotrifluoroethane 50% Acetone 50% | 16 |
| Example 8 | n-Hexane 50% Trichlorotrifluoroethane 50% | 46 |
| Example 17 | Trichlorotrifluoroethane 30% Acetone 70% | 16 |
| Example 18 | Trichlorotrifluoroethane 50% Acetone 50% | 12 |
| Example 19 | n-Hexane 50% Trichlorotrifluoroethane 50% | 26 |
| Not treated |  | 405 |

6. Additive for Coating

(Anti-blocking and Soil resistance)

100 Parts of a vinyl chloride coating (Vinylose manufactured by Dainippon Paint) and 5 parts of a 10% solution of the copolymer prepared in Example 4 or 15 in n-hexane were mixed and coated by means of a bar coater No. 8 on a decorative laminated plywood and dried.

For comparison, a mixture of 100 parts of the same vinyl chloride coating and 5 parts of n-hexane was prepared and coated on the same plywood and dried.

On the thus coated plywood, a cellophane mending tape (manufactured by Nichiban) of 18 mm wide was strongly pressed with a finger and quickly peeled off. This procedure was repeated. While the surface of the coating not containing the copolymer of the invention was peeled off after one time, the surface of the coating containing the copolymer of the invention was not peeled off after six time.

The surface of the coated plywood was stained with soot accumulated in a muffler of an automobile and wiped by cloth. The surface of the plywood coated with the coating containing the copolymer of the invention was less contaminated and cleaned by wiping while that coated with the coating not containing the copolymer was blackly contaminated.

What is claimed is:

1. A copolymer comprising
(a) repeating units of the formula:

$$-OCH[(CH_2)_pR_f]CH_2- \quad (Ia)$$

or $$-OCH_2CH[(CH_2)_pR_f]- \quad (Ib)$$

wherein $R_f$ is $C_3$–$C_{21}$ perfluoroalkyl and p is an integer of 1 and 10 and
(b) repeating units of the formula:

$$-(OCH_2)_m(CH_2)_n- \quad (II)$$

wherein m is an integer of 1 to 4 and n is an integer of 2 to 10 when m is 1, an integer of 1 to 8 when m is 2 or an integer of 0 to (12−2m) when m is 3 or 4, $$-OCH_2CR^1R^2CH_2- \quad (III)$$

wherein $R^1$ and $R^2$ are each hydrogen, $CH_3$, $CH_2Cl$, $CH_2F$, $CH_2OCH_3$, $CH_2OC_2H_5$, $CH_2OCOCH_3$, $CH_2OC_6H_5$, $CH_2OH$ or $CH_2CN$ provided that at least one of them is not hydrogen, $$-OCH_2(OCH_2CH_2)_q- \quad (IV)$$

wherein q is 2 or 3, and/or $$-[(R^3)_r-COO]- \quad (V)$$

wherein $R^3$ is $CH_2$ or $CF_2$ and r is an integer of 2 to 5.

2. A copolymer according to claim 1, wherein a molar ratio of the repeating units (a) and (b) is from 3:97 to 99:1.

3. A copolymer according to claim 1, wherein the repeating unit (b) is that represented by the formula:

$$-(OCH_2)_m(CH_2)_n- \quad (II)$$

wherein m and n are the same as defined above.

4. A copolymer according to claim 1, wherein the repeating unit (b) is that represented by the formula:

$$-OCH_2CR^1R^2CH_2- \quad (III)$$

wherein $R^1$ and $R^2$ are the same as defined above.

5. A copolymer according to claim 1, wherein the repeating unit (b) is that represented by the formula:

$$-OCH_2(OCH_2CH_2)_q- \quad (IV)$$

wherein q is the same as defined above.

6. A copolymer according to claim 1, wherein the repeating unit (b) is that represented by the formula:

$$-[(R^3)_r-COO]- \quad (V)$$

wherein $R^3$ and r are the same as defined above.

7. A water- and oil-repellent comprising a copolymer according to claim 1.

8. A water- and oil-repellent according to claim 7, which is in the form of a solution in an organic solvent selected from the group consisting of acetone, methyl ethyl ketone, ethyl acetate, dimethylformamide, methylchloroform, trichloroethylene, trichlorotrifluoroethane, tetrachlorodifluoroethane, hexane, toluene and a mixture thereof.

9. A non-tackifier comprising a copolymer according to claim 1.

10. A non-tackifier according to claim 9, which is in the form of a solution in an organic solvent selected from the group consisting of acetone, methyl ethyl ketone, ethyl acetate, dimethylformamide, methylchloroform, trichloroethylene, trichlorotrifluoroethane, tetrachlorodifluoroethane, hexane, toluene and a mixture thereof.

* * * * *